United States Patent [19]

Akimov et al.

[11] 3,886,002

[45] May 27, 1975

[54] METHOD OF OBTAINING A FUSED, DOPED CONTACT BETWEEN AN ELECTRODE METAL AND A SEMI-CONDUCTOR

[76] Inventors: Jury Stepanovich Akimov, ulitsa Kosmonavtov, 4, kv. 30; Auli Alexandrovich Galaev, ulitsa Podbelskogo, 6, korpus 7; Semen Samuilovich Gorelik, ulitsa Valovaya, 4-2/44, kv. 8; Boris Izrailevich Gofman, ulitsa 2 Kabelnaga, 10, kv. 53; Vyacheslav Dmitrievich Ermoshin, ulitsa Ilovaiskaya, 6, kv. 4, all of Moscow; Stanislav Konstaninovich Korovin, ulitsa Zelenaga, 18, Domodedovo, Moskovskoi oblasti; Vladimir Vasilievich Naumov, ulitsa Scherbakovskaya 26/30, kv. 202, Moscow; Konstantin Andreevich Preobrazhentsev, ulitsa Narodnogo Opolcheniya, 16, korpus 3, kv. 8, Moscow; Stanislav Vladislavovich Fronk, Sirenevy bulvar, 36, kv. 154, Moscow; Vadim Lvovich Shvartsman, Krasnokazarmennaya ulitsa 3, kv. 323, Moscow; Vladimir Vasilievich Garshenin, Cherkizovskaya ulitsa, 6 korpus 4, kv. 93, Moscow; Oleg Fedorovich Stakhov, Volgogradsky Prospekt, 158, korpus 2, kv. 6, Moscow; Igor Ivanovich Kruglov, 15 Parkovaya ulitsa, 46 korpus 1, kv. 35, Moscow; Mark Markovich Samokhvalov, ulitsa Krasikova, 8, korpus 2, kv. 48, Moscow, all of U.S.S.R.

[22] Filed: June 20, 1973

[21] Appl. No.: 371,844

[52] U.S. Cl. ................ 148/180; 148/171; 148/175; 148/178; 148/182; 148/185; 204/38 B; 204/38 S; 204/192

[51] Int. Cl. ................................................ H01l 7/46

[58] Field of Search ........... 148/177, 178, 180, 185, 148/182, 171, 175; 204/38 R, 38 B, 38 S, 192

[56] References Cited

UNITED STATES PATENTS

| | | | |
|---|---|---|---|
| 2,945,285 | 7/1960 | Jacobs | 148/177 |
| 3,425,880 | 2/1969 | Paletto | 148/185 |

*Primary Examiner*—R. Dean

[57] ABSTRACT

A multilayered structure containing an electrode metal, doping agents and titanium is made on the surface of a semi-conductor. In order to form such a structure the surface of the semi-conductor is directly coated with a layer of titanium on which an electrode metal layer is deposited. After that the layers of the doping agents and electrode metal are deposited in an alternating order. The structure thus obtained is heated to a temperature of the eutectic of "electrode metal - semi-conductor." On the surface of the semi-conductor a melt is formed to contain the electrode metal and the doping agents. Since the oxides of the semi-conductor are reduced, a regular front of fusion of the electrode metal and diffusion of the doping agents into the semi-conductor is thus provided.

13 Claims, No Drawings

METHOD OF OBTAINING A FUSED, DOPED CONTACT BETWEEN AN ELECTRODE METAL AND A SEMI-CONDUCTOR

The present invention relates to the manufacture of semi-conducting devices, and, more particularly, to a method of obtaining a fused, doped contact between an electrode metal and a semi-conductor, and can be utilized in the production of transistors, diodes and in particular varicups with a reciprocal concentration gradient of the doping agent in the base of p-n junction.

It is common knowledge that the reciprocal gradient of concentration of impurities, e.g. such a distribution of impurities at which the concentration of active extrinsic atoms decreases in the direction away from the junction boundary, can be obtained by way of fusing-in the material of the electrode doped with appropriate impurities.

One of the methods known in the art is that a tablet (a ball) made of an electrode material (metal), doped with appropriate impurities is placed on the surface of a semi-conducting plate and is heated to the temperature of the eutectic of "semi-conducting material - metal." Then it is held at that temperature for a period of time sufficient to provide for the formation of a fluid phase of the melt of the materials from which diffusion of the doping agents into the semi-conductor takes place at the same temperature. After the process of diffusion the structure is cooled.

In order to obtain varicups with a reciprocal gradient of the concentration of impurities it is possible to utilize an electrode metal (alloy) composed of tin-aluminum-antimony which is fused in the p-type conductivity silicon at a temperature of 1000°C. During the same process the doping agents are diffused into the bulk of the semi-conductor from the melt formed in the course of fusing-in the electrode metal (alloy) at a temperature close to the fusing-in temperature. Since the coefficient of diffusion of aluminum is higher by two orders than that of antimony, with the concentration of antimony in the melt being higher than that of aluminum, a semi-conducting diode type structure will be formed.

When the electrode metal formed from an alloy containing tin, aluminum and antimony is fused in the silicon of the electronic conductivity type, a transistor structure of the n-p-n type can be obtained.

If the electrode metal being fused in the semi-conductor contains one of the doping agents, a conventional p-n junction or a doped ohmic contact can be obtained. For example, when the tin-aluminum alloy is fused in the silicon of the n-type, a p-n junction is formed, and when the same alloy is fused in the silicon of the p-type, an doped ohmic contact is attained.

Yet, the above method, though multipurpose as it is, has certain disadvantages.

Firstly, because of a deep fusion of the electrode metal and fluctuation of the front of the fusion it is difficult to obtain thin bases of a device, of the order of 2–4$\mu$.

Secondly, the method described does not ensure fused p-n junctions or doped ohmic contacts in sufficiently large areas (over 2 $mm^2$) since it necessitates increased quantity of the electrode metal to be fused-in which results in anomalous distortions of the front of the fusion and in the occurrence of considerable mechanical stresses in the semi-conductor crystal.

Thirdly, since the concentration of doping agents in the electrode metal (alloy) unambiguously determines the parameters of the devices and there is no possibility of providing for a sufficient chemical uniformity of the alloy in the process of its preparation, a certain spread of the parameters of the devices is inevitable.

The object of the present invention is to provide fused, doped contacts having a considerable area.

Another object of the present invention is to increase the chemical uniformity of the fused contact.

Still another object is to reduce the spread of the parameters of the devices and especially those with thin bases.

This and other objects are achieved when in order to attain a fused contact between an electrode metal and a semi-conductor, the melt, according to the invention, is obtained by way of heating a multilayered structure formed in such a way that a layer of metal, less than 1000A thick, capable, when heated, to reduce the oxides of the semi-conductor, is applied directly on the surface of the semi-conductor, said layer being overlaid with a layer of electrode metal, over 1000A thick, and then with alternating layers of the doping agents and electrode metal, whereby a melt containing the material of the semi-conductor, the electrode metal and the doping impurities is produced on the surface of the semi-conductor when the multilayered structure is heated to a temperature which should not be less than that of the eutectic of "electrode metal - semi-conductor."

One of the advantages of the method proposed is that when the melt is cooled the electrode metal is deposited on the clean semi-conductor substrate on the surface of which there are no oxidic films, which are reduced by titanium at a relatively low temperature. At the same time the thickness of the electrode metal layer may be very small (microns or fractions of a micron) and that provides for a small depth of fusion. And this makes it possible to secure a continuous and regular front of fusion as well as high chemical uniformity of the melt and negligible mechanical stresses in the area where the contact between the electrode metal and the semi-conductor is obtained.

The summary thickness of the electrode metal layers in the multilayered structure amounts to 95–99 per cent of the whole thickness of the multilayered structure. In this case the concentration of a doping impurity in the melt which determines the parameters of the reciprocal gradient depending on the specific parameters of the volt-farad characteristic, is obtained within the range of concentrations from $1 \times 10^{16}$ to $1 \times 10^{18}$ $cm^{-3}$, the impurity forming a p-n junction being not less than $5 \times 10^{18}$ $cm^{-3}$.

To realize the method proposed it is preferable to utilize silver, gold or tin, since these are the best metals to form simple eutectic systems with a semi-conducting material.

Titanium, niobium or zirconium are proposed to be utilized to reduce the oxides on the surface of the semi-conductor. These metals are to be applied using the vapor deposition method.

It seems appropriate that between the layers of the metal reducing the oxides and the layer of the electrode metal, a layer of nickel be deposited from the vapor phase, its thickness being 2 to 10 times as large as that of the metal layer reducing the oxides. This will make it possible to further deposit the electrode metal by an electrochemical method.

When the proposed method is utilized to manufacture varicups the donor and acceptor impurities must be in different layers. Since the rate of diffusion of one of the doping agents in the semi-conductor is higher than that of the other, a structure with the reciprocal gradient of concentration of impurities required to obtain varicups with a high coefficient of capacitance overlapping will be formed in the course of diffusion.

The present invention will be better understood from the examples illustrating the method of the invention.

The following is an example of carrying out the method of the invention to obtain the contact between an electrode metal and a doped ohmic contact in the course of manufacturing a varicup with the reciprocal gradient of concentration in the base of junction.

A plate of silicon of the $p^+$-type conductivity doped with boron and having a specific resistance of 0.01 Ohm/cm is to be taken. The surface on which a contact is provided is ground and polished. Then a film of silicon of the p-type conductivity, $6 \pm 0.5\mu$ thick, doped with boron up to the specific resistance of about 20 Ohm/cm is deposited on the surface by any method known in the art.

On a plate of the $p^+$-p-type conductivity thus produced, a layer of titanium, about 300A thick, is deposited by vacuum evaporation at a pressure of $1 \times 10^{-4}$–$1 \times 10^{-5}$ mm Hg and at a temperature of the substrate of 200°–600°C. Then, under the same conditions, the layers of the following metals are deposited consecutively: silver, about $2\mu$ thick, which is the electrode metal; aluminum, about 1000A thick, which is an acceptor ensuring the formation of the reciprocal concentration gradient of impurity; silver, about $1\mu$ thick, a layer of which prevents the aluminum drop formation both in the process of fusion and in the process of introduction of another impurity; antimony, about 1500A thick, which is a donor impurity to provide for a p-n junction; and, finally, silver, about $1\mu$ thick, which prevents the evaporation and drop formation of an antimony film in the process of fusion. Thus, a multilayered structure is formed ensuring the further fusion of the electrode metal and the doping agents. After that the multilayer structure is heated to a temperature of 950°–1200°C as a result of which there is formed on the surface of the semi-conductor an eutectic melt, containing the electrode metal, the doping agents and the products of the reaction of titanium with the oxides of the semi-conductor which accumulate as slag on the surface of the melt. At this temperature the melt is held for a certain period of time sufficient to make the doping agents diffuse from the melt to the semi-conductor, thus providing for the formation of the reciprocal concentration gradient of impurities and the p-n junction. Then the plate is cooled to room temperature.

To obtain an ohmic contact on the opposite side of the semi-conducting plate it is necessary to clean its surface by any method known in the art to consecutively deposit the following layers: titanium, 300A thick; nickel, 600A thick, deposited from the vapor phase; silver, $1\mu$ thick; aluminum, about 1000A thick, to dope the contact; and silver, about $1\mu$ thick. A multilayered structure obtained as a result is heated up to a temperature of 830°–950°C, held for 15–20 min. and then cooled.

The plate is divided into crystals by chemical pickling to result in the formation of mesas. For this purpose the plate is glued to a fluoroplastic disk from the side of the ohmic contact while a layer of bitumen is applied from the opposite side through a mask with round holes, 1 mm dia, intended to protect the surface of the crystal. The structure is pickled first in nitric acid to remove a portion of the doping agent and then in a mixture of hydrofluoric, nitric and acetic acids in the ratio of 2:9:4 to remove a layer of silicon, over 8–$10\mu$ thick, and thus form mesas. Then the plate is washed in water and toluene and dried.

The p-n junctions, thus produced, are protected by the deposition of films of oxides and nitrides of silicon (SiO, $SiN_{41}$) obtained by a method of ion-plasmic reactive sputtering, thereupon final division of the plate into crystals is made by scribing. The crystals thus obtained are arranged in a housing to which a cap is cold-welded.

The varicup produced is characterized by the following electric parameters: coefficient of overlapping - 18, within the range of bias voltages from 1 to 25 V; puncture voltage - 30 V; reverse current - not less than 1A at 30 V; quality factor - not less than 100 at a bias of 1 V and frequency of 1 meg.

The following is another method of obtaining a doped contact.

After an epitaxy structure of the $p^+$-type conductivity is obtained the working surface of an epitaxy film is coated in $1 \times 10^{-4}$ to $1 \times 10^{-5}$ mm Hg vacuum at a temperature of the substrate of 200°–600°C with a layer of niobium, 300A thick, to be overlaid with a layer of nickel, 300A thick by vapor deposition and then with layers of the electrode metal - tin and doping agents. Further, the process of manufacturing a varicup is similar to that described above.

Consider an example of manufacturing a high-voltage varicup with an abrupt p-n junction.

A plate of silicon of the $n^+$-type conductivity doped with phosphorus with a specific resistance of 0.01 Ohm/cm is produced, to this end its surface must be appropriately prepared to provide for epitaxial growth of a silicon film of the n-type conductivity doped with phosphorus to the specific resistance of about 6 Ohm/cm, about $25\mu$ thick.

A plate of silicon of the $n^+$-n type conductivity thus produced is consecutively coated by a method of vacuum evaporation at a pressure of $110^{-4}$ to $110^{-5}$ Hg, with the following layers: zirconium, about 100A thick; silver, about $2\mu$ thick; aluminum, about 1500A thick; and again silver, about $1\mu$ thick.

A multilayer film thus formed is heated to a temperature of 950°–1200°C and held for a period of time sufficient for the mixing of the melt and then cooled. In the process of cooling, an epitaxy layer, from the melt, doped with aluminum is grown on the initial substrate of silicon of the n-type conductivity, whereby a p-n junction of the $p^+$-n type is formed. From the opposite side of the plate an ohmic contact is formed in a manner similar to that shown in the following example.

The plate is divided into crystals by chemical pickling of the unprotected semi-conducting material to result in the formation of mesas. For this purpose the plate is coated with an acid-proof masking coating by a photolithographic method known in the art and the doping is removed from the unprotected areas. Then a second coating is applied and the silicon is pickled in a mixture of hydrofluoric, nitric and acetic acids in the ratio of 2:9:4 to a depth of about 15$\mu$ thus forming mesas.

The p-n junctions thus produced are protected by the deposition of films obtained by a method of ion-plasmic reactive sputtering whereupon the final division of the plate into crystals is made. The crystals are arranged in a housing and made air-tight by a method known in the art.

The following is an example of producing a doped ohmic contact with silicon of the n-type conductivity.

In order to obtain such a doped ohmic contact the surface of the semi-conductor plate is pre-heated and cleaned mechanically and chemically. Then the surface is consecutively coated with layers of titanium, about 100A thick, and nickel, 500–1000A thick, in vacuum by sputtering.

After the layers have been deposited the surface of nickel is coated by a chemical or electrochemical method with a layer of gold, 0.5–1.5$\mu$ thick, on which by a method of thermal evaporation in vacuum of $1 \times 10^{-4}$ to $1 \times 10^{-5}$ mm Hg. at a temperature of the substrate of 200° to 500°C a layer of antimony, about 2000A thick, is deposited and overlaid with a layer of gold or silver, about 1$\mu$ thick.

The multilayer structure thus produced is heated to a temperature of 400°–600°C whereby a melt is formed to contain silicon, gold and antimony. When the melt is cooled, an ohmic contact doped with antimony is formed while the oxides of titanium and silicon accumulate as slag on the upper layer of the electrode metal and do not affect the electrical parameters of the device because nickel is fully dissolved in the melt and is not deposited as a separate phase.

What we claim is:

1. A method of producing a fused doped contact between an electrode metal selected from the group consisting of silver, gold and tin and a semi-conductor comprising coating the surface of the semi-conductor essentially with a layer of a transition metal selected from the group consisting of titanium, niobium and zirconium at the reducing temperature of the semi-conductor oxide, coating said layer with a layer of the electrode metal and then with alternating layers of a doping agent and the electrode metal whereby a multilayer structure is formed having a doping agent layers between the electrode metal layers, heating the multilayer structure to a temperature not less than the temperature of the eutectic of "electrode metal-semi-conductor" for a time sufficient to obtain on the surface of the semi-conductor a melt containing the material of the semi-conductor, the electrode metal and the doping agents and to permit diffusion of the doping agent from the melt into the semi-conductor to form a p-n junction, and cooling the semi-conductor to obtain a doped ohmic contact.

2. A method as claimed in claim 1 wherein the total thickness of the electrode metal layers amounts to 95–99 per cent of the whole thickness of the multilayer structure.

3. A method as claimed in claim 1 wherein the materials forming the layers of the multilayer structure are deposited from the vapor phase.

4. A method as claimed in claim 1 wherein the electrode metal is silver.

5. A method as claimed in claim 1 wherein the electrode metal is gold.

6. A method as claimed in claim 1 wherein the electrode metal is tin.

7. A method as claimed in claim 1 wherein the transition metal is titanium.

8. A method as claimed in claim 1 wherein the transition metal is niobium.

9. A method as claimed in claim 1 wherein the transition metal is zirconium.

10. A method as claimed in claim 1 wherein the surface of the transition metal layer is coated with a layer of nickel having a thickness two to ten times as large as that of the transition metal.

11. A method as claimed in claim 10 wherein the nickel is deposited from the vapor phase.

12. A method as claimed in claim 11 wherein the electrode metal and the doping agents are deposited by the chemical or electrochemical technique.

13. The method as claimed in claim 1 wherein the semi-conductor is silicon.

* * * * *